United States Patent
Cossey, Jr. et al.

(10) Patent No.: US 6,264,042 B1
(45) Date of Patent: Jul. 24, 2001

(54) BILATERAL SORTER

(75) Inventors: James R. Cossey, Jr., Snellville; Victor N. Prutu, Duluth; Richard J. Tew, Alpharetta, all of GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 09/439,398

(22) Filed: Nov. 15, 1999

(51) Int. Cl.[7] .................................................. B07C 5/00
(52) U.S. Cl. ..................... 209/559; 209/552; 209/509; 198/890; 198/890.1; 198/570; 198/571; 198/572; 198/575; 198/577; 198/597
(58) Field of Search ..................................... 209/559, 651; 198/890, 570, 571, 572, 575, 577, 597

(56) References Cited

U.S. PATENT DOCUMENTS

| | | |
|---|---|---|
| 1,729,671 | 10/1929 | Bell-Irving et al. . |
| 1,939,891 | 12/1933 | Glahn et al. . |
| 2,758,728 * | 8/1956 | Henry . |
| 2,895,593 | 7/1959 | McKnight et al. . |
| 3,071,239 * | 1/1963 | Burtness . |
| 3,231,068 | 1/1966 | Harrison et al. . |
| 3,384,237 | 5/1968 | Leonard . |
| 3,451,526 * | 6/1969 | Fernandez . |
| 3,642,113 | 2/1972 | Burgis . |
| 3,680,692 * | 8/1972 | Southworth . |
| 3,782,527 | 1/1974 | Petershack . |
| 3,857,478 | 12/1974 | Meeusen . |
| 4,143,755 | 3/1979 | Keller . |
| 4,174,774 | 11/1979 | Bourgeois . |
| 4,180,150 | 12/1979 | Moore . |
| 4,200,178 | 4/1980 | Gunti . |
| 4,239,434 * | 12/1980 | Gannon . |
| 4,555,010 | 11/1985 | Solund . |
| 4,633,996 | 1/1987 | Waterhouse . |
| 4,730,718 | 3/1988 | Fazio et al. . |
| 4,732,260 | 3/1988 | Canziani . |
| 4,798,275 | 1/1989 | Leemkuil et al. . |
| 4,962,841 | 10/1990 | Kloosterhouse . |
| 5,027,939 | 7/1991 | Kilper et al. . |
| 5,052,542 * | 10/1991 | Wipf . |
| 5,165,516 | 11/1992 | Reed et al. . |
| 5,205,394 * | 4/1993 | Zeuschner . |
| 5,699,892 | 12/1997 | Shyr et al. . |
| 5,711,410 | 1/1998 | Cai et al. . |
| 5,868,238 * | 2/1999 | Bonnet . |
| 5,967,290 * | 10/1999 | Bonnet . |
| 5,971,132 * | 10/1999 | Bonnet . |
| 5,979,633 * | 11/1999 | Bonnet . |

FOREIGN PATENT DOCUMENTS

| | | |
|---|---|---|
| 25 47 899 | 4/1977 | (DE) . |
| 28 18 425 | 11/1979 | (DE) . |
| 295 19 805 A | 1/1996 | (DE) . |
| 0438 667 A2 | 7/1991 | (EP) . |
| 0 477 104 | 3/1992 | (EP) . |
| 2 387 879 | 11/1978 | (FR) . |
| 3-256919 | 11/1991 | (JP) . |
| PCT/US98/ 08597 | 3/1998 | (WO) . |

* cited by examiner

Primary Examiner—Donald P. Walsh
Assistant Examiner—Mark J. Beauchaine
(74) Attorney, Agent, or Firm—Alston & Bird LLP (57) ABSTRACT

A system for sorting objects includes an upstream and a downstream conveyor positioned to sequentially receive and convey an object along a first path, and a sorting conveyor belt positioned transversely in a gap between the upstream and downstream conveyors. The sorting conveyor is tilted with respect to the plane of the other conveyors, and carries flexible projections that lift one edge of the object and push it The operation of the sorting belt reduces static friction between the object and the main conveyors as the object is pushed. The system also includes a measuring device operatively linked to provide dimensions and position information about the object to a sorting conveyor controller.

35 Claims, 8 Drawing Sheets

Fig. 1

_Fig_2

VELOCITY AT PACKAGE SORTATION
VELOCITY BACK TO INITIAL POSITION (A)

(B) _Fig_10

Fig. 3

Fig_4

Fig_5

BILATERAL SORTER

FIELD OF THE INVENTION

This invention relates to sorting systems, and more particularly to a bilateral sorting device and method for sorting objects that selectively diverts the objects off a main conveyor path to one or more secondary conveyor paths.

BACKGROUND OF THE INVENTION

Automated sorting of parcels is becoriing widespread because it reduces labor costs while enabling fast and reliable parcel delivery services. However, many conventional automated parcel sorting systems require extensive hardware and computer controls to accurately track and move objects along predefined paths. Further, such automated parcel sorting systems often occupy a large amount of space.

With many moving parts and logic devices, conventional automated parcel sorting systems may be prone to break down and result in costly down time. Additionally, a large number of parts and logical devices can make a system more difficult to repair, replace, and maintain. If expensive parts are replaced to save down time, rather that repaired, the cost of operating the system increases.

Some automatic sorting systems operate on the principal of pushing objects off a conveyor using a suspended paddle or the like. These systems may have difficulty in consistently diverting thin items, such as letters, which may pass or jam under the suspended paddle. Other systems have a complex system of transverse belts that are lifted from between driven rollers to divert objects from an initial path. Generally, the raised area defined by the lifted belts must be comparable in length to the object being diverted.

When a sorting system must divert objects of diverse size, other problems may arise. In a parcel sorting system, for example, a fast moving paddle in a high speed sorting system might effectively divert parcels of medium size and weight, but send very light parcels flying and possibly damage heavy parcels on impact If a parcel has an unusually positioned center of gravity, the paddle may tumble or spin the parcel in an uncontrolled manner. Furthermore, heavy parcels are difficult to divert accurately while the conveyor line is moving at full speed, which may be several hundred feet per minute. Many prior systems slow or stop the main conveyor line while an object is being diverted off the line.

Accordingly, there is a need in the art for an automated parcel sorting system that has a reduced number of parts and expensive electromechanical elements, that occupies less space, and that can divert thin items consistently. There is a further need in the art for a sorting system that can adapt to effectively and safely divert a sequence of objects that vary widely in size, shape, weight, and center of gravity, while the main conveyor is moving at a high speed. A further need exists in the art for increasing the sorting rate of objects in such systems.

SUMMARY OF THE INVENTION

The present invention seeks to provide an automated parcel sorting system with a small number of parts and electromechanical elements, that occupies less space, that can divert thin items consistently, and that adapts to divert at a high sorting rate a sequence of objects that vary widely in size, shape, weight, and center of gravity.

These objects are achieved in the present invention by a system for sorting objects, comprising: an upstream and a downstream conveyor positioned to sequentially receive and convey an object along a first path, the conveyors defining a gap transverse to the first path; an elongate sorting member positioned in the transverse gap; a diverter movable to intersect the object moving along the first path; and an actuator connected selectively to move the diverter to shift the object off the conveyors, and selectively to allow the object to pass over the gap without being diverted.

In one aspect of the invention, the elongate member including a generally planar portion sloping upwardly from the upstream conveyor across the gap toward the downstream conveyor, such that a leading portion of the object is raised above the upstream conveyor as the object crosses the gap. This raising action substantially reduces the friction between object and the conveyors as the object is pushed off the conveyors. The downstream conveyor may be positioned higher than the upstream conveyor. Preferably, the elongate member is movable transversely with respect to the gap, and the diverter comprises upwardly projecting cleats movable with the elongate member, the cleats being placed in a section of the elongate member adjacent to the generally planar portion.

According to another aspect of the invention, a measuring device is positioned to determine a transverse position on the upstream conveyor of a side edge of the object opposite a side of the conveyor to which the object is to be diverted; and the sorting member includes at least one projection extending upwardly from the cairier strip; the actuator being connected selectively to move the projection adjacent to the path of the side edge of the object prior to the object reaching the sorting member. The actuator preferably comprises a controller configured to move the sorting member in response to a signal from the measuring device indicating an approaching object. The controller preferably receives from the measuring device the transverse position on the upstream conveyor of the side edge of the object opposite the selected side of the conveyor to which the object is to be diverted, and causes the actuator to position the diverter section of the sorting member adjacent to the path of the side edge of the object prior to the object reaching the sorting member. The controller preferably further receives from the measuring device longitudinal positions of the leading and trailing edges of the object, and causes the actuator to move the projections against and under the object at a selected location along its length.

According to another aspect of the invention, the elongate member is a sorting member including an elongate carrier strip defining at least one diverter section comprising a plurality of flexible, spaced apart projections extending upwardly from the carrier strip, and at least one generally planar section adjacent to the diverter section. The actuator is connected selectively to move the projections against and under an object travelling across the sorting member to carry the object off the conveyors, and selectively to position the planar section in the path of an object to allow the object to pass over the sorting member without being diverted.

In each of these aspects of the invention, the sorting member or device may preferably be an endless flexible belt carrying a plurality of groups of flexible cleats inter-spaced with non-cleated sections of the belt The belt may be reversibly driven transversely to the first direction so that the system provides three destinations for each object, two side diversion paths and a straight pass-through path. Alternatively, the sorting member may be a reciprocating linear strip or slat In either case, the belt or strip may have a width in the first direction considerably less than the length of the objects being sorted.

A bilateral sorter and a method for sorting an object according to a preferred embodiment of the present invention can increase sorting rate by measuring the dimensions of the object and calculating an approximate maximum acceleration and velocity at which an object can be moved without tipping or rotating. The bilateral sorter substantially reduces or eliminate tipping or rotating of an object by pre-positioning the sorting member in accordance with an object's dimensions. Additionally, the present invention employs a sorting member that can substantially reduce the static friction between the object and neighboring conveying devices.

The present invention may be considered in relation to a system for sorting objects, employing a conveyor device for moving an object along a first path. The sorting system further includes a sorting device for moving the object along a sort direction. The sorting device has structures for lifting and pushing or both the object, where the structures reduce static friction between the object and the first conveyor device. Adjacent to the sorting device is a second conveyor device for moving an object along a third path. The sorting device is typically disposed between the first and second conveying devices. With the sorting of the present invention, spacing between objects to be sorted is minimized while compactness of the sorter system is maximized.

To minmwe the space in between objects in the sorting system, the sorting device in the system includes structures that engage with an object to be sorted such that the object can be moved rapidly and efficiently. The structures maximize efficiency of the movement of the object by substantially reducing the static friction between an object and the first conveyor device and the sorting device itself. The structures of the sorting device may be protrusions, projections, or protuberances extending from a belt The projections can have a predefined shape in addition to multiple shapes repeating in a predefined manner. In one aspect of the present invention, the structures are flexible cleats disposed upon an endless flexible belt. Alternatively, flexible cleats can be disposed on a reciprocating strip or slat The belt or strip can have a width less than half the length of the object being diverted.

In addition to providing structures to substantially reduce the static friction between an object and the first conveying device, the sorting system of the present invention also measures and uses the dimensions and position of an object to enable the sorting system to calculate an optimal acceleration and velocity at which to move an object away from the first conveying device with the sorting device without tipping or rolling. The utilization of the actual dimensions and position of an object also permits the sorting system to determine when an object will arrive at the sorting device after being conveyed by the first conveying device and to prepare for the object's arrival. Ascertaining the position of an object permits the sorting system to pre-position the sorting device such that the structures on the sorting device readily engage the object instantaneously upon the arrival of the object at the sorting device. This in turn, enables the sorting system of the present invention to substantially minie the spacing between objects that are to be sorted.

To ascertain the dimensions of an object, in one aspect of the present invention, the sorting system includes a measuring device that is operatively linked to the sorting device. The measuring device provides one of length, width, and height dimensions of an object to the sorting device. The sorting device calculates an acceleration and velocity at which to move an object without tipping or rotating the object. In one aspect of the present invention, the sorting device accelerates the object according to an S-curve acceleration profile. The measuring device of the sorter system in one preferred embodiment is also an optical measuring device such as a light curtain. Light beams may be provided to detect the transverse edge positions of the object, the leading and trailing edges, and the height of the object.

The present invention in one embodiment employs a programmable servo motor as an intelligent driving mechanism for the sorting device. The intelligent driving mechanism is operatively linked to the measuring device as well as the driving mechanism for the first conveying device. With such an intelligent driving mechanism, it is not necessary to use position encoders to track the objects for the sorting function. In another embodiment, a programmed logic controller can be used as an intelligent driving mechanism for the sorting device in conjunction with position encoders.

In yet another aspect of the present invention, a method for sorting objects includes moving an object along a first path and determining whether the object should be sorted. If the object is to be sorted, then the dimensions of the object are calculated and a sorting device is pre-positioned based on the dimensions of the object. The object is sorted by the sorting device where the sorting device can lift and push the object along a sort direction away from the first path. If the object should not be sorted, then the object is moved across the sorting device.

According to yet another aspect of the invention, objects are accurately delivered from one conveyor to another. Such a system for sorting objects, comprises a first conveyor positioned to convey an object along a first direction toward a sorting position, the object having a pair of peripheral points transverse to the first direction; a second conveyor positioned to receive the object from the first conveyor in a selected portion of the second conveyor, a measuring device positioned to detect at least one of the peripheral points of the object on the first conveyor, and a controller configured to adjust a speed of at least one of the conveyors in response to the detected peripheral points to cause the object to be delivered to the selected portion of the second conveyor.

Other goals, features, and advantages of the present invention will become apparent upon reviewing the following detailed description of the preferred embodiments of the invention, when taken in conjunction with the drawings and the appended claims.

DETAILED DESCRIPION OF EXEMPLARY EMBODIMENTS

The present invention is preferably employed in an automated parcel sorting environment where numerous packages or parcels are moved along conveying devices and are typically sorted based upon destination of the parcel or package. However, the present invention is not limited to this application and can be used in other areas where objects are needed to be sorted. For example, the present invention may be employed to sort pallets or parts in a warehouse or manufacturing environment The friction reducing structures of the sorting device can be designed to move parts or free-flowing materials such as nuts and bolts. Other sorting applications could include the separation of raw materials or stacked paper applications.

Figure 1:
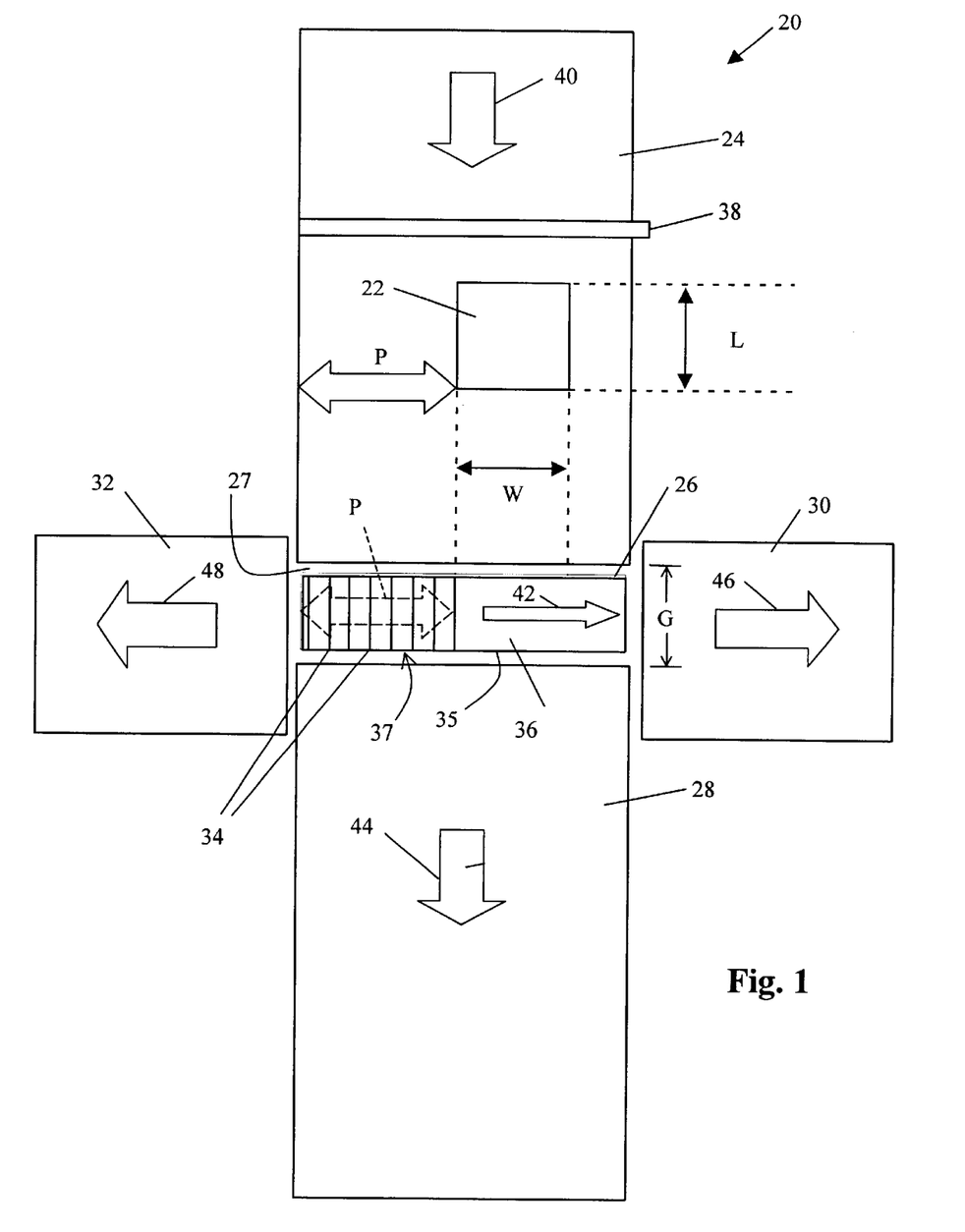
FIG. 1 is a top view of the sorting system of the present invention.

Referring now to the drawings, in which like numerals refer to like parts throughout the several figures, FIG. 1 is a top view of the sorting system 20 that moves parcels or objects 22 from one conveyor path to another. The sorting system 20 includes a first or upstream conveyor 24 which carries the object 22 to a sorting device 26. The sorting device passes the object to a second or downstream conveyor 28, or diverts it away from its original path to either a third conveyor 30 on one side of the conveyors 24, 28, or a fourth conveyor 32 on the other side of the conveyors. The present invention is not limited to the number and orientation of the conveying devices shown. For example, the third conveying device 30 and the fourth conveying device 32 can be disposed at angles not aligned with the sorting device 26. The first conveyor 24 may be referred to herein as the input conveying device while the second, third and fourth conveyors 28, 30 and 32 are referred to as output conveying devices relative to the sorting device 26. While the conveyors shown in the preferred embodiment are belt conveyors, the term "conveyor" is used herein to refer to any conveying device. Furthermore, the conveyors 30 and 32 may be replaced by chutes or receptacles to receive objects diverted from the conveyors 24 and 28. Photoelectric sensors 31 may be positioned to monitor the entrance to the conveyors 30 and 32 to confirm actual removal of objects during sorting.

The sorting device 26 is positioned in a transverse gap 27 between the conveyors 24 and 28. The sorting device 26 includes an elongate base 35 divided into a substantially planar region 36 that is designed to permit an object 22 to slide over from the upstream conveyor 24 to the downstream conveyor 28, and a diverting region 37 that includes projections 34 designed to engage with the object 22. These structures will be described in more detail below. The sorting device 26 is operatively linked to a measuring device 38 which provides position and dimension information to a controller 53 of the sorting device described below. The measuring device, preferably a conventional "light curtain" sensor or other known article dimensioning apparatus, enables the sorting device 26 to measure the dimensions of the object 22 such as the length L and width W of object 22, and optionally its height The sorting device 26 utilizes the width dimension W of the object 22 in order to calculate a pre-positioning distance P such that the projections 34 of the sorting device 26 will be substantially aligned with an edge of the object 22 upon its arrival at the sorting device 26 if the object 22 is to be sorted. This pre-positioning of the projections 34 substantially reduces or eliminates the risk of contacting an object 22 too quickly or at too high a speed, causing it to roll or tumble during high speed sorting with the sorting device 26. Further details of the measuring device and the pre-positioning of the sorting projections will be discussed with respect to the embodiment as illustrated in FIG. 2.

The first conveying device 24 moves the object 22 along a first path 40 while the second conveying device 28 moves the object along a second path 44. The third conveying devoce 30 moves the object 22 along a third path 46 while the fourth conveying 32 moves the object 22 long a fourth path 48. The sorting device 26 as illustrated in FIG. 1 will sort the object 22 in a sort direction 42. However, the sorting device 26 can sort in directions other than those illustrated. For example, the sorting device 26 can pre-position projections 34 on an opposite side of object 22 and sort the object 22 in a direction towards the fourth conveying device 32 so that the object will be moved along the fourth path 48.

The conveying devices, 24, 28, 30, and 32 are preferably belt conveyors made of synthetic woven materials, such as nylon, to provide a low friction outer surface.

Figure 2:
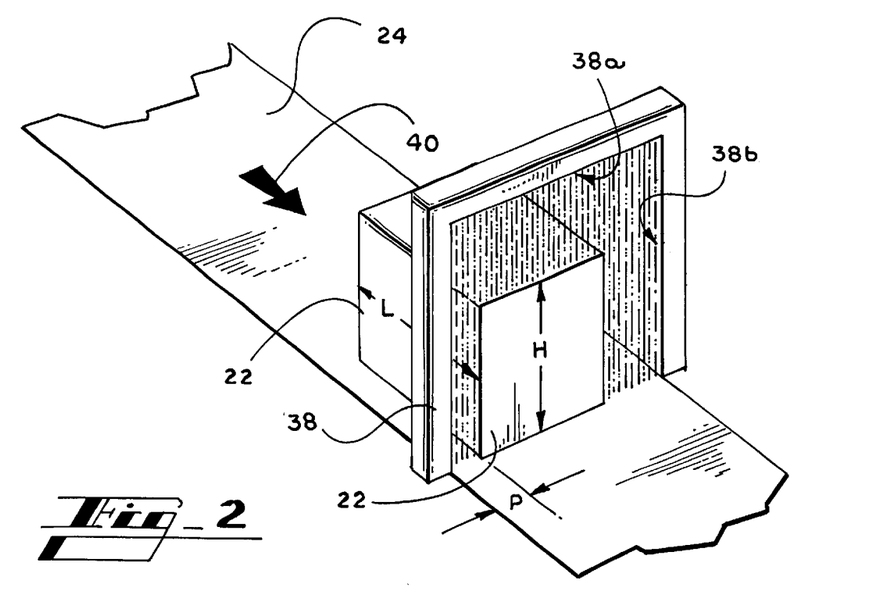
FIG. 2 is a perspective side view of a parcel and the measuring device of the present invention.

FIG. 2 illustrates a perspective view of the measuring device 38 and an object 22 to be sorted by the sorting system 20. With the measuring device 38, the sorting device 26 can readily ascertain dimensions of object 22. Such dimensions include the length L, width W and height H of the object 22. The measuring device 38 may be a photoelectric sensor device such as a conventional "light curtain" photoarray. Such a device is sold under the brand name "Banner Mini-Array," which provides detection beams and interleaved photocells every ⅜ inch. An overhead array 38a detects the side edges of the object 22 (and enables calculation of the width W), while a vertical array 38b determines the height H. Either array can provide a timing signal to the sorting device 26 marking the passing of the leading edge or trailing edge of the object, also enabling calculation of the length L. The measuring device 38 is operatively linked to the sorting device 26. The measuring device 38 provides signals to the controller 53 of the sorting device 26 corresponding to the aforementioned dimensions of the object 22. Other sensors are not beyond the scope of the present invention. Other suitable sensors include, but are not limited to, mechanical switches, CCD cameras coupled to digital image processors, infrared beams coupled to mirrors, and other like sensing arrangements. If desired, the object's dimensions and center of gravity can be determined using an apparatus as described in U.S. Pat. No. 5,672,815.

Although the object is sometimes referred to herein as having side edges, some objects are irregular in shape. However, each object has a pair of peripheral points transverse to its path of travel in the first direction. When applicable, the term "side edge" refers to the path of such a peripheral point along the conveyor.

In a preferred embodiment the measuring device 38 emits light energy in order to detect edges of object 22. The width W of object 22 is determined by a corresponding number of beams that are blocked by an edge of the object 22. The length of the object 22 can be determined based upon detecting a leading edge and a trailing edge of object 22 in conjunction with detecting the speed of the first conveying device 24.

Figure 3:
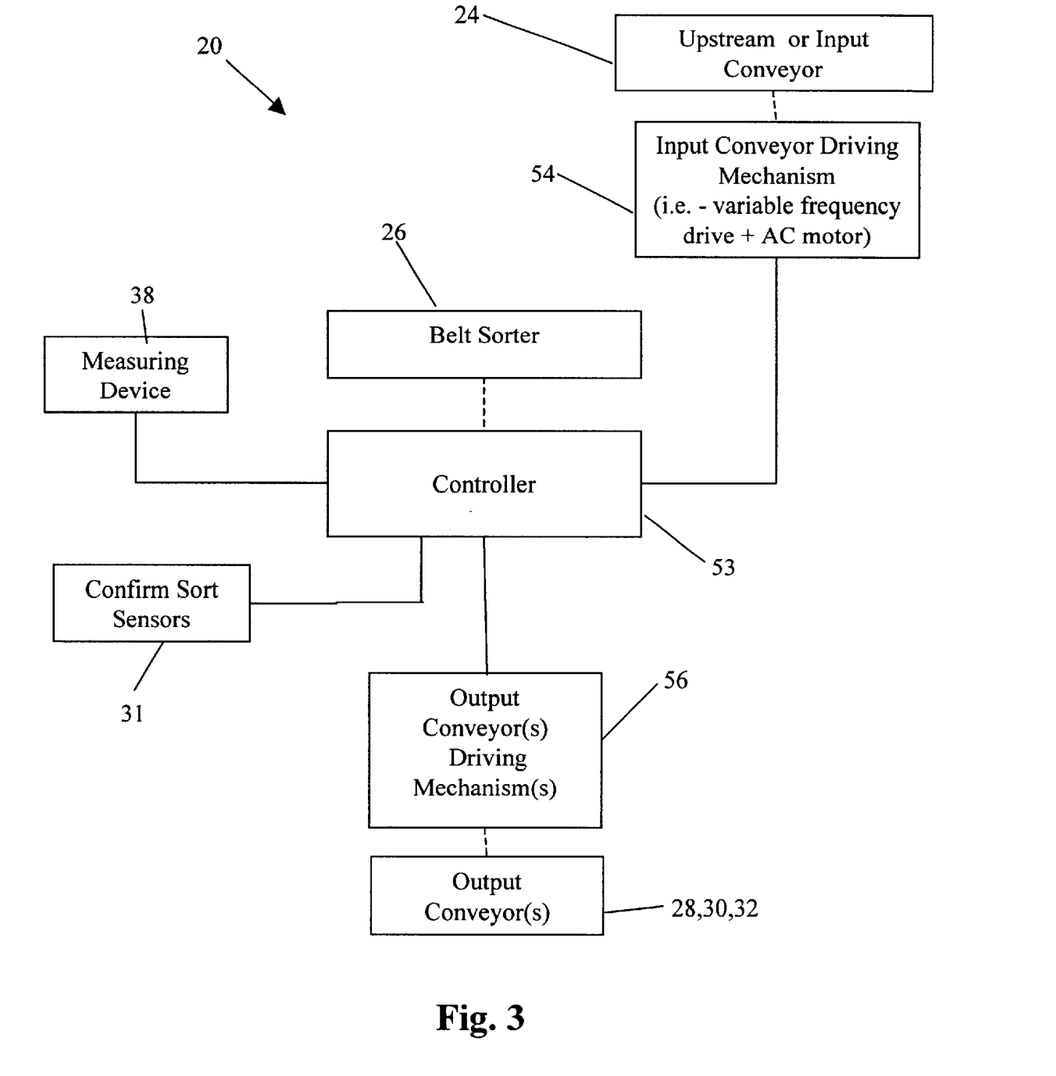
FIG. 3 is a functional block diagram of the components of the parcel sorting system of the present invention.

FIG. 3 illustrates a functional block diagram of the sorting system 20 of the present invention. In the preferred embodiment, the base 35 of the sorting device 26 is an endless timing belt 50 and a belt driving mechanism 52. Further details of the timing belt 50 of the sorting device 26 will be discussed with respect to FIGS. 4–8. The intelligent belt driving mechanism 52 preferably includes a controller 53. The controller may be the processor of a conventional programmable servo motor, available, for example, from Anamatics. The controller is programmed to communicate with the measuring device 38 and a conveyor driving mechanism 54 of the upstream conveyor 24. Alternatively, the belt 50 can be driven by a non-programmable servo motor or stepper motor controlled by a general purpose computer or by a programmed logic controller.

Operatively linked to the controller 53 of the sorting belt driving mechanism 52 is the input conveyor driving mechanism 54. The input conveyor driving mechanism 54 preferably includes a variable frequency drive and an AC motor. However, other motor and motor control arrangements are not beyond the scope of the present invention. Other motor arrangements for the input conveyor driving mechanism include, but are not limited to, progranmnable servo motors, AC motors coupled to a programmable logic controller, motors such as universal, induction, and synchronous motors (such as stepper motors), and other like motors. The input conveyor driving mechanism 54 drives the upstream conveyor 24 at a constant speed, and provides a signal representative of such speed to the controller 53. Similarly, the output conveyors 28, 30, 32 are operated by output conveyor driving mechanisms 56.

Figure 4:
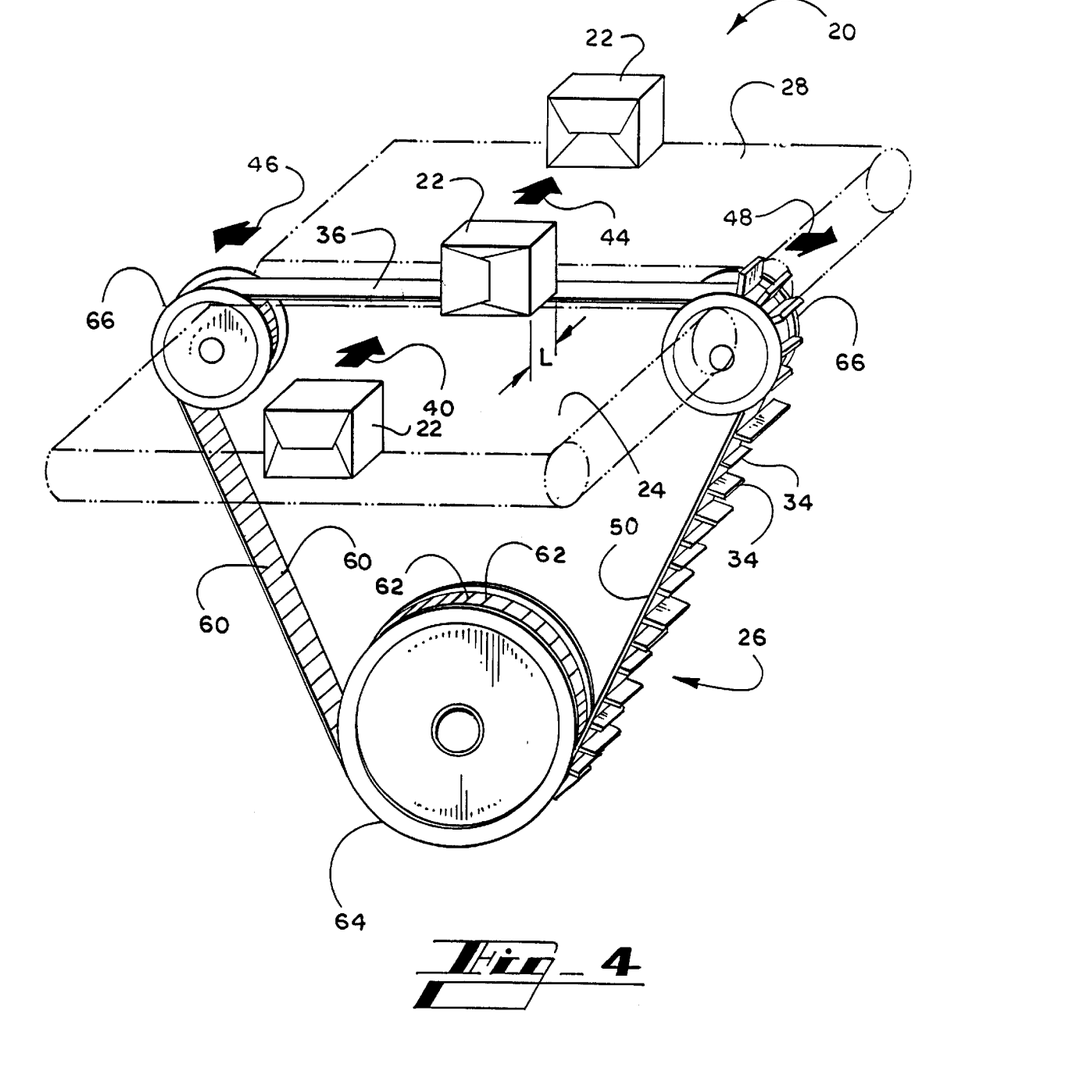
FIG. 4 is a perspective view of the parcel sorting system of the present invention when an object is permitted to flow from the first conveying device over the sorting device to a second conveying device.

FIG. 4 illustrates a perspective side view of the sorting system 20 of the present invention. Specifically, FIG. 4 illustrates a mode of operation in which an object 22 (shown in three sequential positions over time) is permitted to flow from the first conveying device 24 across the substantially planar region 36 of the sorting device 26 to the second conveying device 28. To facilitate smooth flow of the object across the substantially planar region 36 of the sorter device 26, a length dimension L of object 22 should preferably be greater than a width dimension G of the gap 27 accommodating the sorting device 26.

The sorting device 26, as noted above, includes projections 34 that project on one side of the timing belt 50. On a side of the belt opposite the projections 34 the belt includes teeth timing cogs 60 that engage timing grooves 62 disposed on a driving pulley 64 and idler pulleys 66 in a conventional manner. The driving pulley 64 is connected to an output shaft of the motor 52. The teeth 60 of belt 50 substantially eliminate slippage of the belt 50 while also permitting the controller 53 to operate the motor 52 to rotate the driving pulley 64 and accurately position and track the projections 34 along the belt 50.

Each of the pulleys is preferably made of aluminum, however, other materials are not beyond the scope of the present invention. In one exemplary embodiment, the pulleys are arranged to orient the belt 50 in a triangle with one side generally in the plane of the conveyors 24 and 28. Such a triangular arrangement enables the belt 50 to maintain a relatively large contact surface area with each of the pulleys. However, other spatial arrangements of the belt 50 are not beyond the scope of the present invention. Other spatial arrangements include, but are not limited to, rectangular and square, using four pulleys; linear, using two pulleys; and other polygonal shapes.

The belt 50 may include one diverter section 37 containing projections 34 and one planar region 36 as shown in FIG. 4, or additional alternating diverter and planar sections. An arrangement of alternating planar regions 36 and regions which contain projections 34 would permit the sorting device 26 to pre-position the projections 34 in any desired fashion without having to rotate the belt 50 for more than a half of a revolution.

Figure 5:
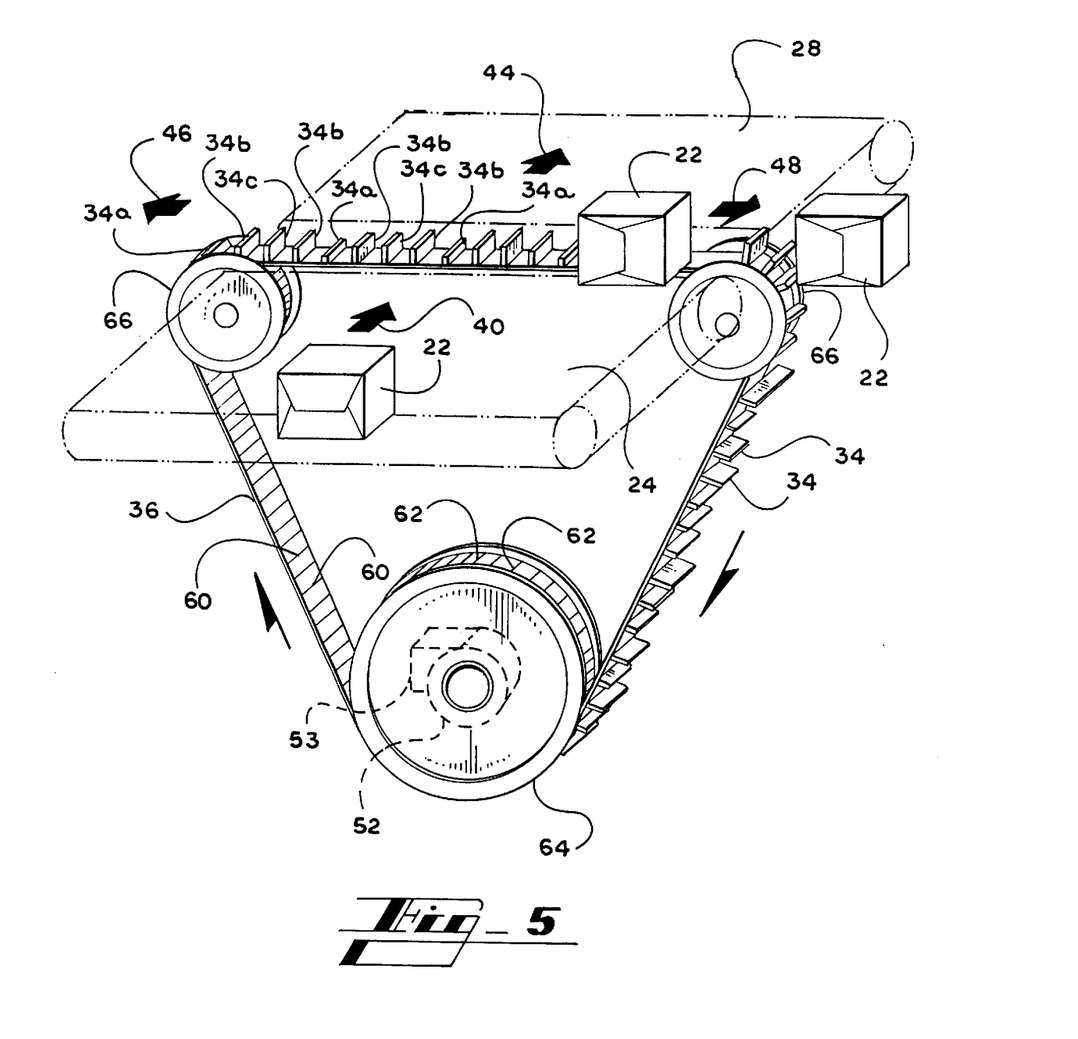
FIG. 5 is a perspective view of the parcel sorting system of the present invention, where an object is moved by the first conveying device and then to a sorting direction and third path with the sorting device.

FIG. 5 illustrates an embodiment similar to that- shown in FIG. 4 except that the diverting region of the belt 50 containing projections 34 covers two sides of the triangular path of the belt. as opposed to one side as illustrated in FIG. 4. In FIG. 5, object 22 is intended to move from the first path 40 to the fourth path 48. In order to move object 22 along the fourth path 48, the intelligent belt driving mechanism 52 rotates the driving pulley 64 in a clockwise manner as viewed in the drawing. Conversely, if object 22 was intended to move along the third path 46, the controller 53 and driving mechanism 52 would rotate the driving pulley 64 in a counter clockwise fashion (not shown).

Figure 6:
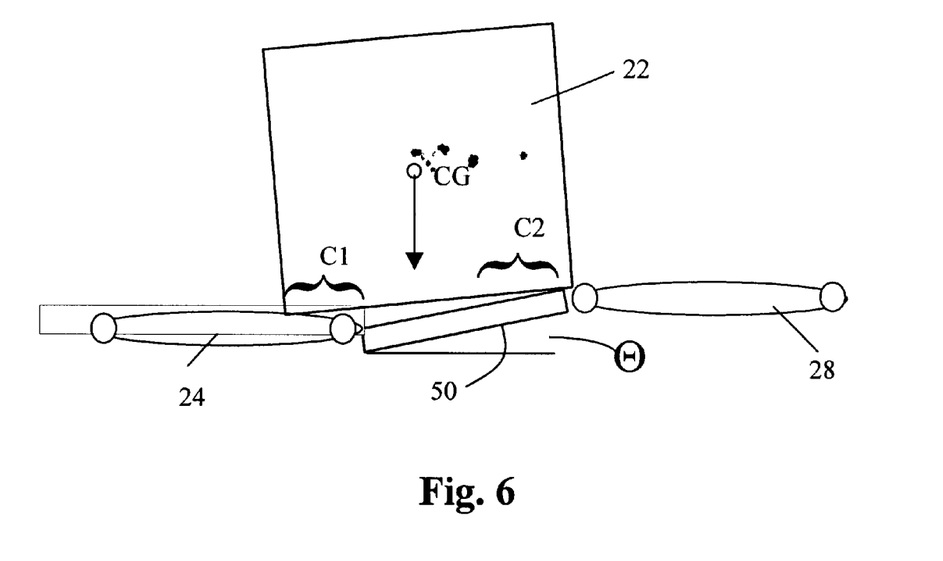
FIG. 6 is a side view of the sorting device disposed between the first, and second conveying devices of the parcel sorting system.

FIG. 6 illustrates a side view of the belt 50 relative to the first conveying device 24 and the second conveying device 28. The support structure (not shown) for the pulleys 64 and 66 is tilted to slope the base 35 of the belt as it traverses the gap 27. This tilting creates a ramp from the upstream conveyor 24 to the downstream conveyor 28, which is position slightly higher than the conveyor 24. The slope of the ramp is at an angle theta θ, which preferably is about 5 degrees. However, other angles are not beyond the scope of the present invention. As an object 22 engages the non-cleated planar area 36 of the belt 50, its leading edge will be lifted as it climbs the ramp, thereby reducing the contact area between object 22, the first conveying device 24, and belt 50 itself.

As a result of positioning belt 50 at angle θ, the sorting device 26 creates a small contact area C1 with the upstream conveyor 24 and a small contact area C2 with the belt 50. The belt 50 can be disposed with its upstream edge slightly below the level of the upstream conveyor 24 or alternatively substantially aligned therewith. Relative to the downstream conveyor 28, the belt 50 is disposed such that its downstream edge is either above the second conveying device 28 or substantially aligned therewith. Upon contact with the downstream conveyor, an object not being diverted will be drawn onto the downstream conveyor. The position of belt 50 is dictated by the most appropriate position where object 22 can flow from one conveying device to another in a substantially smooth manner with minimal static friction with the conveyors and the belt. An object not being diverted thus will move easily across the belt 50, while an object being diverted will experience minimal frictional drag while being pushed off the conveyors 24 and 28. The downstream conveyor 28 may be operated at a somewhat higher speed than the upstream conveyor 24, to help rotate the object and assist in its removal from the conveyors. For example, the upstream conveyor may have a speed in a range of about 50 to 500 feet per minute, and the downstream conveyor may be operated at about 50 to 500 fpm higher than the upstream conveyor.

Figure 7:
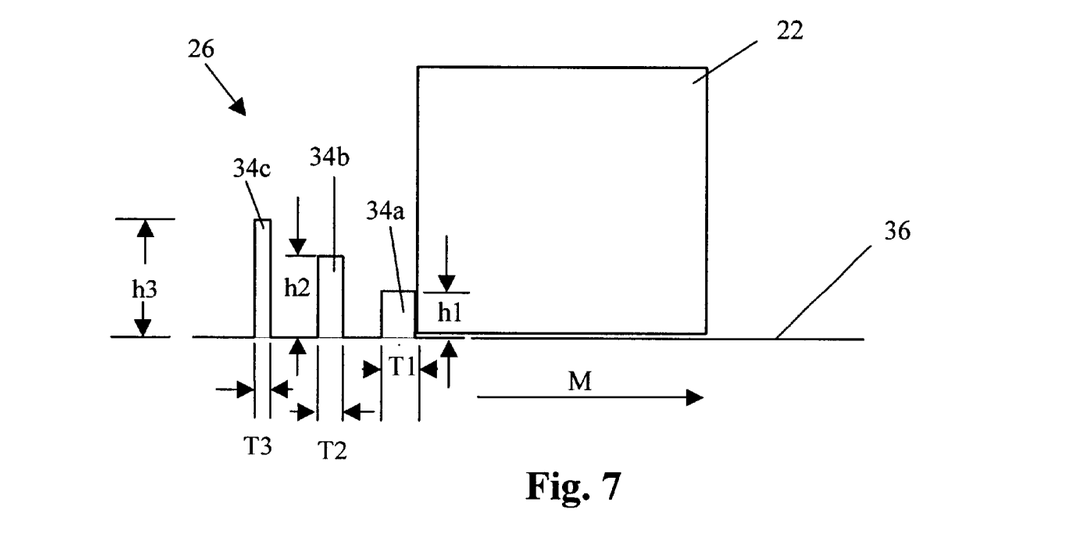
FIG. 7 is a side view of the structures of the sorting device pushing an object.

Referring to FIGS. 5 and 7, the flexible projections or cleats 34 are arranged on the belt 50 in groups forming a diverting region 37. In this embodiment, the projections 34 are placed in symmetric groupings having three projections to a group. In each group of three projections 34, each projection has a different thickness and height relative to a neighboring projection. Preferably, a leading projection 34a is placed adjacent to a planar region 36, and is followed by successively taller projections 34b and 34c, which are followed by additional projections 34b and 34a, and so on, to form a sine wave profile of flexible projections.

The projection 34a has a thickness T1 and a height H1 while the second projection 34b has a thickness T2 and height H2. Similarly, the third projection 34c has a thickness T3 and a height H3. The values for each of the thickness and height values as used in one embodiment of the invention are illustrated in Table One.

TABLE ONE

SYMMETRIC GROUPINGS OF PROJECTIONS

| Projection 34A | | Projection 34B | | Projection 34C | |
|---|---|---|---|---|---|
| H1 | T1 | H1 | T1 | H1 | T1 |
| ¼" | ¼" | ¾" | ⅛" | 1" | 1/16" |

While Table T1 illustrates a one embodiment of the dimensions of the projections 34 of the present invention, other dimensions are not beyond the scope of the present invention. The profiles discussed above are placed in the symmetric grouping in order to facilitate movement of the object 22 in the preferred sorting directions. The width of the belt 50 and of the profiles is preferably 2" or 50.8 mm. However other dimensions are not beyond the scope of the present invention. In alternate embodiments, the height and thickness of the projections 34 can be made constant, or thickness can be varied between projections 34 while keeping each projection 34 at a constant height. Other geometrical arrangements are not beyond the scope of the present invention. Additionally, the number of projections 34 within a grouping can be increased or decreased depending on the operating environment of the sorting device 26.

Figures 8A, 8B, 8C:
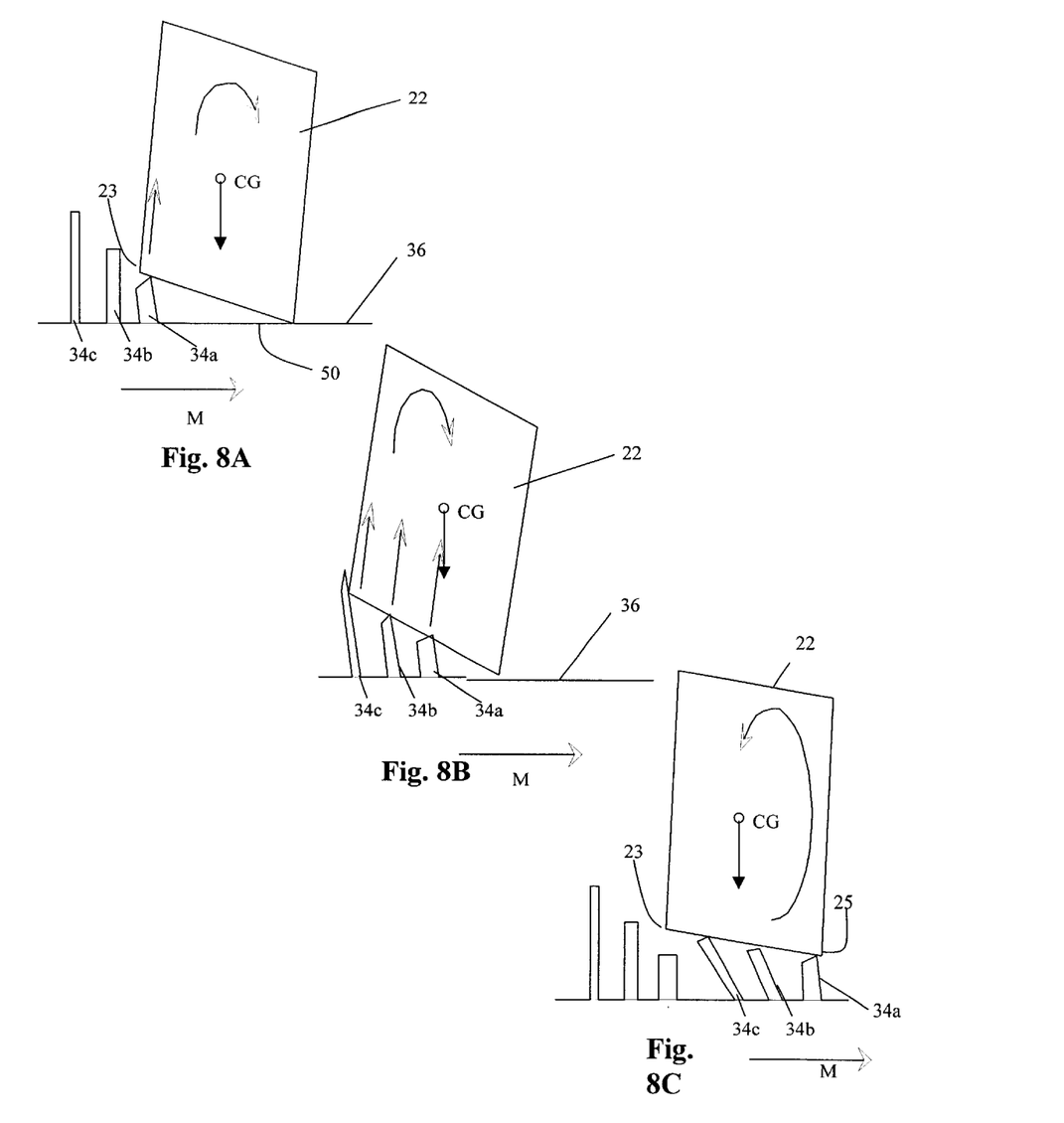
FIG. 8A is a side view of the sorting device where the structures on the sorting device elevate or lift the object.
FIG. 8B is a side view of the sorting device where the structures continue to elevate or lift an object.
FIG. 8C is a side view of the sorting device where the structures on the sorting device continue moving and start to rotate an object on the sorting device.

When object 22 has a relatively small mass, the frictional forces opposing the movement of sorting device 26 along path M is also relatively small. Therefore, the leading projection 34a is designed to contact an edge of object 22 and push the object 22 along path M, as shown in FIG. 7. FIG. 8 illustrates the operation of the projections 34 when sorting device 26 moves a relatively massive or heavy object 22. Specifically, in FIG. 8A, due to the object's mass and the resulting force of gravity and opposing frictional force, the first projection 34a is designed to slide under and elevate a side edge 23 of object 22 while sorting device 26 is moving the projections 34 along the path M. During this instance, object 22 is tipped clockwise around its center of gravity CG.

Next, in FIG. 8B, the second projection 34b and the first projection 34a have slid under the object 22. The object 22 makes contact with the third projection 34c and continues to tip clockwise around its center of gravity CG. If the mass of the object is not too great, the object will be carried off the conveyors 24 and 28 in this configuration.

If the mass is greater still, or it is very wide transverse to its initial direction of travel, the projection 34c and possibly successive projections 34a, 34b, 34c will slide under the object until a side edge 25 of the object is lifted. The object 22 will tend to tip back in a counter clockwise direction when the center of gravity CG is positioned beyond the first projection 34a. It may be seen that the projections 34 of the sorting device 26 are designed continue to lift and elevate the object 22 relative to the first conveying device 24 and the substantially planar regions 36 of the sorting device 26 and then to push the object off of the conveyors. Such lifing of object 22 substantially reduces the static friction that opposes the sorting device 26 while moving object 22 along path M. The projections 34 and belt 50 are preferably unitary in nature and are made from the same flexible or pliable material, for example, rubber. Other durable, flexible materials may also be used. The selection of the material for the belt preferably is based on the desired degree of flexibility of the projections 34, which should be able to slide under the objects and push them, but not damage them on impact.

If an object has a high center of gravity, it may topple transversely away from the direction M upon engagement with the projections 34. In this situation, the object will fall onto the next group of projections in the diverting region 37. These projections will cushion the fall and maintain control of the object while pushing it off the conveyors.

Figure 9:
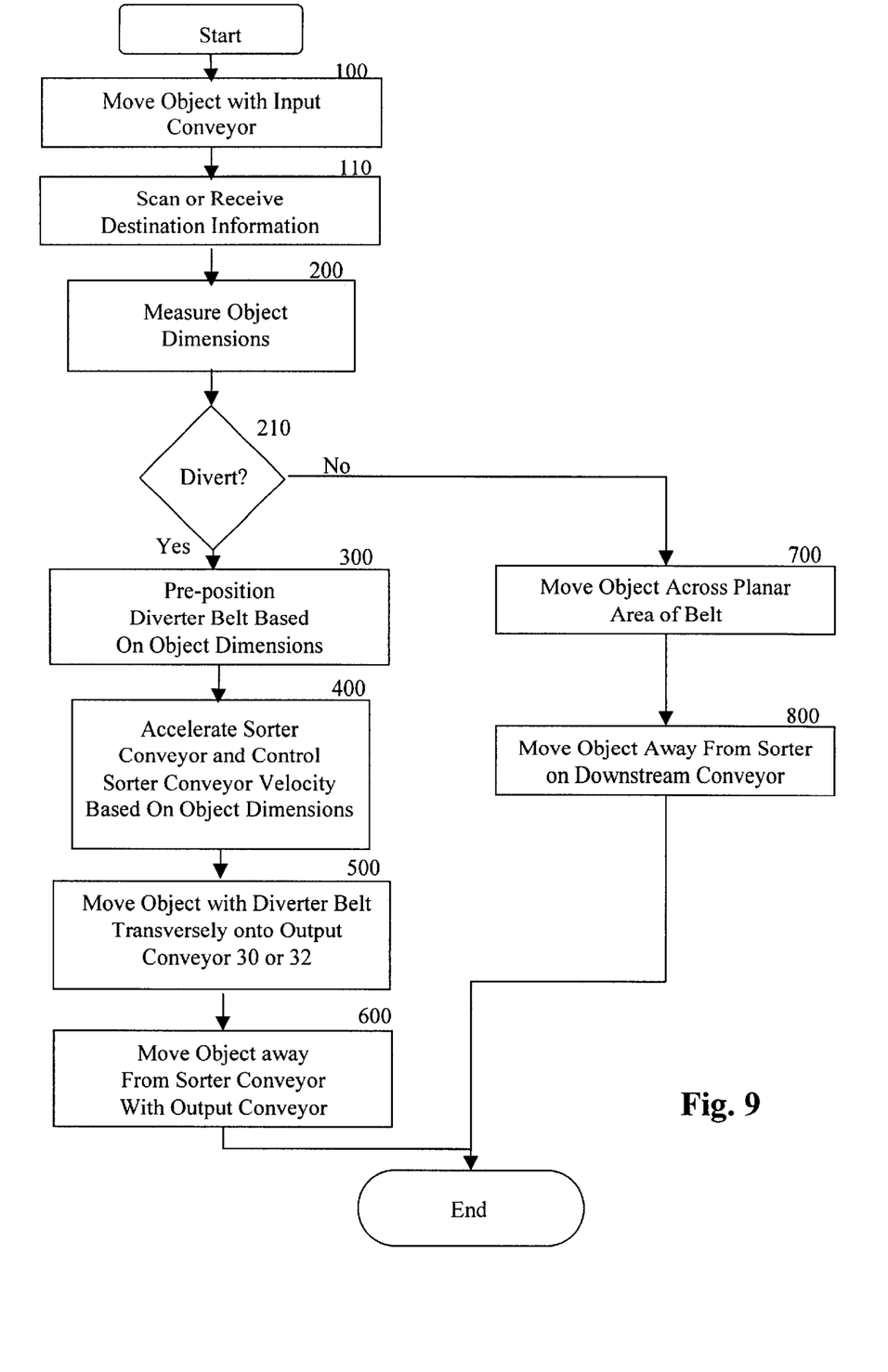
FIG. 9 is a logic flow diagram illustrating a process for sorting an object

Description of Operation of Preferred Sorting System with Reference to the Logic Flow Diagrams The logic flow diagrams described below illustrate the process of sorting objects with the sorting system 20 of the present invention. FIG. 9 is a logic flow diagram of the overall process for sorting an object 22 with the sorting system 20 of the present invention. Step 100 is the first step of the sorting process where the object 22 is moved with the first conveying device or upstream conveyor 24 along the first longitudinal path toward the sorting device 26. At step 110, the controller 53 receives destination information about the object indicating whether it should be passed through to the conveyor 28 or diverted to conveyor 30 or 32. The destination information may be scanned in a conventional manner from an encoded symbol (such as a bar code or two dimensional MaxiCode symbol) on a label or a text label. using optical character recognition (OCR), or the information may be manually entered. Next, at step 200, the dimensions and position of object 22 are determined by the sorting system. The controller 53 retrieves from the measuring device 38 the side edge positions of the object on the conveyor 24, the times at which the leading and trailing edges of the object break and depart, respectively, a beam of the measuring device 38, and the object's height. The measuring device 38 outputs these parameters based on which beams are broken and when they are broken, in a well known manner. In addition to input from the measuring device, the controller receives the speed of the conveyor 24 from its driving mechanism 54. From the times the leading and trailing edges of the object break and depart the beams of the device 38, and the speed of the conveyor 24, the controller calculates the object's length. From the overhead beams broken, the width of the object is directly determined.

At step 210 the controller determines from the destination information whether the object should be diverted, and in which transverse direction. If the object is to be diverted, at step 300 the controller 53 determines a starting position for the first projection 34a based on the desired diverting direction and the transverse position of the side edge of the object opposite the conveyor 30 or 32 to which the object will be pushed. The controller then positions the belt 50 so that a planar region 36 is in the path of the object with the beginning of a diverting region 37 closely adjacent to the path of the above-mentioned side edge. A more complex pre-positioning of the belt could be done based on knowledge of the actual center of gravity of the object. Next, at step 400, the controller 53 calculates an appropriate acceleration and velocity for the belt 50. The controller 53 calculates the volumetric center of the object based on its dimensions, and uses this point as an approximate center of gravity of the object. If the object has passed over a scale (not shown), the weight of the object may be input to the controller. Next, the intelligent belt driving mechanism 52 calculates an approximate maximum acceleration and velocity at which the object 22 can be moved by lateral force exerted at the bottom edge of the object without tipping the object 22, based on the approximated center of gravity.

Figure 10:
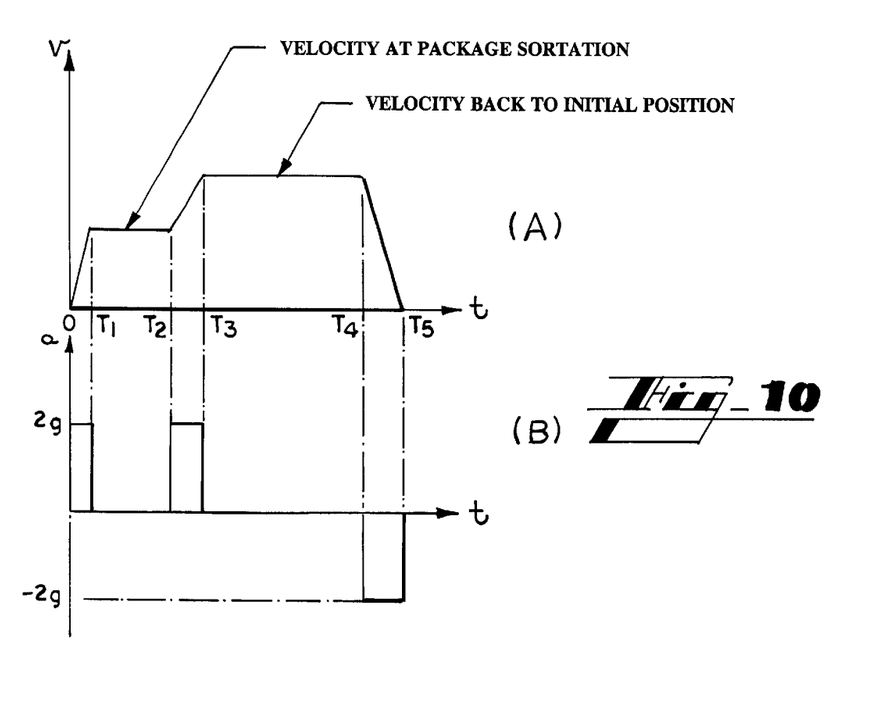
FIG. 10 is a graphical representation of velocity and acceleration profiles for the movement of the sorting belt according to one embodiment of the invention.

One example of velocity and acceleration profiles that can be used with the present invention is shown in FIG. 10. In FIG. 10(A), the velocity profile, at time t=0, the belt has been pre-positioned, the object has arrived and the belt is accelerated at an acceleration equal to 2g (where g is the acceleration due to gravity). At t=T1, the belt velocity has reached its sorting maximum, and remains at this final sorting velocity until T2, when the object is discharged onto a receiving belt 30 or 32. From T2 until T3, the belt again speeds up at a rate of 2g until it reaches a higher return velocity, which is maintained until T4 when the belt nears its initial position. From T4 to T5 the belt decelerates at −2g until the belt reaches its initial position, ready for the next pre-positioning stage. It can be seen that the velocity follows an "S curve" profile from t=0 until t=T3. FIG. 10(B) shows the corresponding rates of acceleration. In one embodiment, a series of acceleration profiles is stored in a look up table, and an appropriate profile is selected based on the objects dimensions, and its weight, if available. The preferred acceleration at the start of movement, beginning from rest at the pre-positioned location, results in a relatively gentle engagement with the object, to avoid damage or bouncing of the object off the cleats 34.

For average size parcels, the final linear speed of the belt 50 during the diverting step preferably is about 300 to 400 feet per minute, with about 330 fpm being a preferred speed.

The object moves to the sorting device 26, up the sloped ramp of the planar region 36 of the belt and then partly onto the conveyor 28. Assuming the destination information requires diverting the object, at step 500 the belt is accelerated and the velocity thereof is controlled based upon the determinations at step 400. The belt begins to move at a time based on the time the object triggered the measuring device 38, and the longitudinal position of the approximate center of gravity. Thus, when the center of gravity CG as shown in FIG. 6 is near or over the belt 50, the controller begins belt movement. The initial projection 34*a* preferably contacts the object one-tird to one-half way from the leading edge along its length. As a result, the projections 34 engage, lift and push the object 22 from the belt 50 to an output conveyor such as the third conveying device 30, or the fourth conveying device 32. The action of the projections 34 is described in detail above.

At step 600 the object 22 is moved away from the belt 50 by the selected output conveyor. If at step 210 the destination information requires no diverting of the object, the belt 50 does not move, and at step 700 the object is carried on across the belt and at step 800 it is carried away on the downstream conveyor 28.

Those skilled in the art will appreciate that many features of the present sorting system can be carried out in an apparatus that tracks the approach of the object to the sorting device 26 using a belt encoder and a programmed logic controller to coordinate the operation of the sorting belt 50. Furthermore, the sorting belt 50 can be operated at a constant speed without selecting a customized acceleration profile as described above.

The present invention thus provides a bilateral sorter and a method for sorting an object that has few moving parts occupies only a small gap in a conveyor line, diverts thin items consistenty, and can adapt to divert at a high sorting rate a sequence of objects that vary widely in size, shape, weight, and center of gravity.

In its preferred embodiment, the bilateral sorter.,of the present invention substantially reduces or eliminates tipping of objects being diverted by pre-positioning a pushing device in accordance with an object's dimensions. The present invention employs structures on the belt conveying device that can substantially reduce the static friction between the object and neighboring conveying devices. The present invention also provides an apparatus and method for delivering objects from one conveyor to a specific location on another conveyor, utilizing information relating to the transverse location of the object on the first conveyor.

While the invention has been described in detail with particular reference to an exemplary embodiment thereof, while we understand that it will be understood that modifications and variations can be made without departing from the scope of the invention as defined in the appended claims.

What is claimed is:

1. A system for sorting objects, comprising:
   an upstream and a downstream conveyor positioned to sequentially receive and convey an object along a first path, said conveyors defining a gap transverse to the first path;
   an elongate sorting member positioned in said transverse gap, said sorting member including an elongate carrier strip defining at least one diverter section comprising a plurality of flexible, spaced apart projections extending upwardly from said carrier strip, and at least one generally planar section adjacent to said diverter section; and
   an actuator connected selectively to move said projections against and under an object travelling across said sorting member to carry the object off the conveyors, and selectively to position said planar section in the path of an object to allow the object to pass over the sorting member without being diverted.

2. The sorting system of claim 1, wherein said carrier strip slopes upwardly from said upstream conveyor across said gap toward said downstream conveyor, such that a leading portion of the object is raised above said upstream conveyor as the object crosses said gap.

3. The sorting system of claim 2, wherein said downstream conveyor is positioned higher than said upstream conveyor.

4. The sorting system of claim 1, wherein said actuator moves said sorting member in either of two directions to divert objects off a selected one of two sides of said conveyors.

5. The sorting system of claim 4, further comprising a measuring device positioned to determine a transverse position on said upstream conveyor of a side edge of the object opposite the selected side of said conveyor to which the object is to be diverted.

6. The sorting system of claim 5, wherein said measuring device comprises a light curtain positioned above said upstream conveyor.

7. The sorting system of claim 5, wherein said actuator comprises a controller configured to move said sorting member in response to a signal from said measuring device indicating an approaching object.

8. The sorting system of claim 7, wherein said controller receives from said measuring device the transverse position on said upstream conveyor of the side edge of the object opposite the selected side of said conveyor to which the object is to be diverted, and causes said actuator to position said diverter section of said sorting member adjacent to the path of said side edge of the object prior to the object reaching the sorting member.

9. The sorting system of claim 8, wherein said sorting member comprises an endless belt, said controller being a programmable servo motor connected to reversibly drive said belt.

10. The sorting system of claim 7, wherein said controller receives from said measuring device longitudinal positions of the leading and trailing edges of the object, and causes said actuator to move said projections against and under the object at a selected location along its length.

11. The sorting system of claim 1, further comprising a sensor positioned to detect an object on said upstream conveyor, and wherein said actuator comprises a controller configured to move said sorting member in response to a signal from said sensor.

12. The sorting system of claim 11, wherein said sensor measures the longitudinal position, length, height and width of the object, and wherein said actuator comprises a controller configured to calculate a speed and acceleration of movement of said sorting member based on dimensions of the object.

13. The sorting system of claim 12, wherein said sorting member comprises an endless belt, said controller being a programmable servo motor connected to reversibly drive said belt.

14. A system for sorting objects, comprising:
an upstream and a downstream conveyor positioned to sequentially receive and convey an object along a first path, said conveyors defining a gap transverse to said first path;
a measuring device positioned to determine a transverse position on said upstream conveyor of a side edge of the object opposite a side of said conveyor to which the object is to be diverted;
an elongate sorting member positioned in said transverse gap, said sorting member including at least one projection extending upwardly from said carrier strip;
an actuator connected selectively to move said projection adjacent to the path of said side edge of the object prior to the object reaching the sorting member; and to move said projection to engage the object and move the object off the conveyors when the object is over the sorting member, and selectively to allow the object to pass over the sorting member without being diverted.

15. The sorting system of claim 14, wherein said sorting member includes an elongate carrier strip defining at least one diverter section comprising a plurality of flexible, spaced apart projections extending upwardly from said carrier strip, and at least one generally planar section adjacent to said diverter section.

16. The sorting system of claim 15, wherein said carrier strip slopes upwardly from said upstream conveyor across said gap toward said downstream conveyor, such that a leading portion of the object is raised above said upstream conveyor as the object crosses said gap.

17. The sorting system of claim 16, wherein said downstream conveyor is positioned higher than said upstream conveyor.

18. The sorting system of claim 15, wherein said actuator moves said sorting member in either of two directions to divert objects a selected one of two sides of said conveyors.

19. A system for sorting objects, comprising:
an upstream and a downstream conveyor positioned to sequentially receive and convey an object along a first path, said conveyors defining a gap transverse to said first path;
an elongate member positioned in said transverse gap, said elongate member including a generally planar portion sloping upwardly from said upstream conveyor across said gap toward said downstream conveyor, such that a leading portion of the object is raised above said upstream conveyor as the object crosses said gap;
a diverter movable to intersect the object moving along said first path; and
an actuator connected selectively to move said diverter to move the object off the conveyors, and selectively to allow the object to pass over the gap without being diverted.

20. The sorting system of claim 19, wherein said elongate member is movable transversely with respect to said gap, and said diverter comprises upwardly projecting cleats movable with said elongate member.

21. A method for sorting objects, comprising:
moving an object along a first path;
determining whether the object should be sorted;
if the object is to be sorted, then
measuring the transverse position of the object relative to the first path;
pre-positioning a sorting device based on the transverse position of the object;
sorting the object with the sorting device by lifting an edge of the object and pushing the object along a sort direction away from said first path;
if the object is not to be sorted, then moving the object across the sorting device onto a third path; and
moving the object along the third path away from said first path.

22. The method of claim 21, further comprising measuring the length, width, and height dimensions of the object; and pushing the object at a speed and acceleration based on said dimensions.

23. The method of claim 22, wherein the step of measuring the dimensions of the object further comprises measuring the length of the object by detecting a leading edge and trailing edge of the object; and further comprising:
measuring a velocity of the object along the first path based on detection of the leading and trailing edges; and
timing the pushing of the object based on the velocity of the object.

24. A system for sorting objects, comprising:
a first conveyor positioned to convey an object along a first direction toward a sorting position, said object having a pair of peripheral points transverse to said first direction;
a second conveyor positioned to receive said object from said first conveyor in a selected portion of said second conveyor,
a measuring device positioned to detect at least one of said peripheral points of said object on said first conveyor; and
a controller configured to adjust a speed of at least one of said conveyors in response to said detected peripheral points to cause said object to be delivered to said selected portion of said second conveyor.

25. The sorting system of claim 24, wherein said second conveyor is positioned substantially transverse to said first conveyor.

26. The sorting system of claim 24, wherein said measuring device comprises a light curtain positioned above said first conveyor to detect at least one of said peripheral points of said object.

27. The sorting system of claim 24, wherein said measuring device detects a plurality of said peripheral points, and said controller calculates at least one dimension of said object in response to said detected peripheral points.

28. The sorting system of claim 27, wherein said controller adjusts a speed of at least one of said conveyors based at least in part on said dimension of said object.

29. The sorting system of claim 27, wherein said peripheral points include a leading edge and a trailing edge of said object, wherein said dimension is a length of said object, and wherein said controller calculates an approximate longitudinal center of gravity of said object based at least in part on said length of said object and adjusts a speed of at least one of said conveyors based at least in part on said center of gravity.

30. The sorting system of claim 27, wherein said controller selects an acceleration profile from a look up table based at least in part on said dimension of said object and uses said acceleration profile to adjust a speed of at least one of said conveyors.

31. The sorting system of claim 24, wherein said controller receives from said measuring device transverse position information for one of said detected peripheral points, and is configured to position said second conveyor with respect to said transverse position information.

32. The sorting system of claim 24, wherein said controller adjusts a speed of at least one of said conveyors based at least in part on a weight of said object.

33. The sorting system of claim 24, wherein said controller adjusts a speed of at least one of said conveyors based at least in part on a center of gravity of said object.

34. The sorting system of claim 24, wherein said controller adjusts a speed of said second conveyor.

35. The sorting system of claim 24, wherein said second conveyor comprises a plurality of upwardly extending projections adjacent to said selected portion.

* * * * *